UNITED STATES PATENT OFFICE.

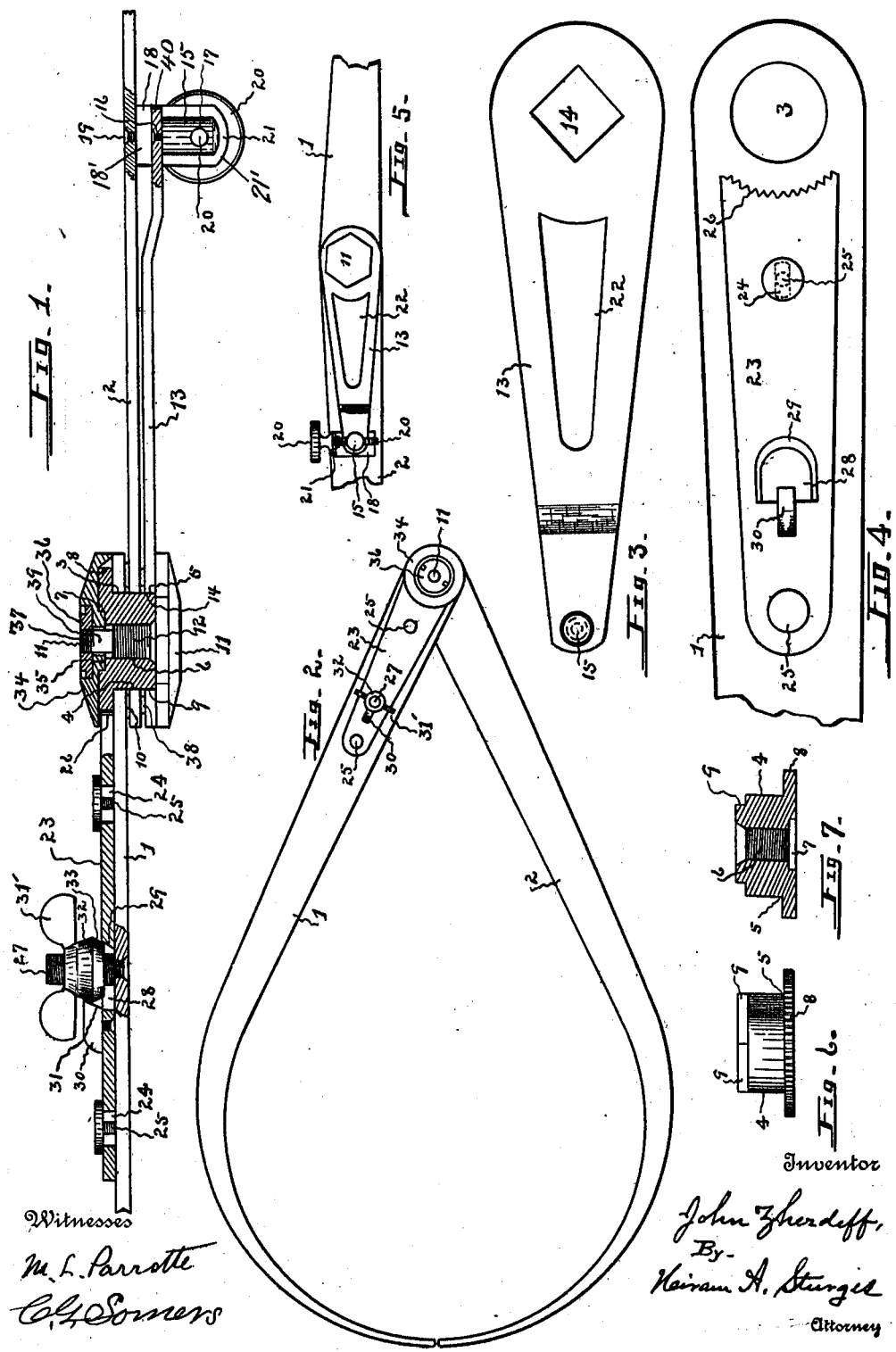

JOHN ZHERDEFF, OF OMAHA, NEBRASKA.

CALIPERS.

993,810.  Specification of Letters Patent.  Patented May 30, 1911.

Application filed July 26, 1910. Serial No. 573,870.

*To all whom it may concern:*

Be it known that I, JOHN ZHERDEFF, a citizen of the United States, residing at Omaha, in the county of Douglas and State of Nebraska, have invented certain new and useful Improvements in Calipers, of which the following is a specification.

This invention relates to an improvement in calipers of the class used for making outside measurements, and has for one of its objects to provide a structure whereby the heavy parts or obtrusive handle usually employed at the pivotal end of the members may be dispensed with.

The invention has reference to a novel means for securing the members in fixed relation with reference to each other when ascertaining diameters, which conduces to reliability and accuracy, and includes certain features relating to convenience in use.

With these and other objects in view, the invention presents a novel construction and arrangement of parts as described herein and as illustrated in the drawing, wherein—
Figure 1 is a broken away, edgewise view of the caliper arms when extended, parts thereof being in section; the pivot member, inclosing-cap and disk-nut also being in section. Fig. 2 is a side view of a pair of calipers embodying my invention. Fig. 3 is a plan view of the adjusting plate. Fig. 4 is a plan or side view of an end portion of one of the caliper members and the slidable engaging-plate or locking-member. Fig. 5 is a broken away side or plan view showing the pivotal mounting and adjusting devices of the calipers, being a view of the side opposite to that shown in Fig. 2. Fig. 6 is a side view of the pivot member, and Fig. 7 is a view of the same in longitudinal section.

Referring now to the drawing for a more particular description, numerals 1 and 2 indicate the respective inwardly curved arms of the calipers, their inner ends being provided with circular apertures 3, the bores of said apertures corresponding to the diameter of the cylindrical body-portion 4 of pivot-member 5. Pivot-member 5, best shown in Figs. 6 and 7, is provided with the threaded aperture 6 extending longitudinally thereof and opening upon annular recess 7 formed in one of its ends. It is provided at its end, adjacent to recess 7, with the annular flange 8, said flange having a finely toothed, serrated or milled edge, as clearly shown in Fig. 6, its opposite end being provided with angularly formed walls or facets 9.

When assembling the parts, arms 1 and 2 are mounted upon pivot-member 5, said member being inserted within apertures 3, arm 1 of the calipers being seated adjacent to flange 8, and as thus described the arms may move freely while supported upon body-portion 4 of said pivot-member, washer 10 (Fig. 1.) preferably being employed and seated between the arms, the parts being held together or in operative relation by means of screw-nut 11, said nut having a comparatively large, threaded stem 12 engaging the threaded aperture 6 of the pivot-member.

Numeral 40 indicates the outer edge of the bracket forwardly from the end of plate 13.

In order that measurements may be accurately taken, certain devices are employed now to be described.

At 13 is indicated an adjusting-plate provided with an angular aperture 14 at one of its ends for a seating upon facets 9 of the pivot 5, its opposite end being provided with a post 15 secured by pivot 16 to plate 13, said post having a transverse threaded aperture 17. A bracket 18 is provided, and its base is secured to arm 2 of the calipers by means of pivot 19, the end of said base being indicated at 18'.

At 20 is indicated a thumb-screw supported in the upset arm 21 of the bracket, and having a threaded connection with post 15, the end of said arm being indicated at 21'. A rotation of the thumb-screw will cause post 15, together with plate 13 to be moved laterally or in a direction transversely of arm 2. By this construction arm 2 of the calipers is prevented from rotating upon pivot-member 5, except the slight rotatable movement which it may have by operation of thumb-screw 20, and arm 2 is therefore under complete control with respect to its movements upon its pivot.

In many instances when ascertaining diameters, a slight adjustment of arm 2 is desired, and plate 13 and its connections provide means therefor conducing to accuracy and convenience. In practice, when moving the arms of the calipers so that their outer ends will be disposed a specified distance from each other to indicate a specific scale, the operator, after the arms have been moved to approximately a correct position, may then by manipulation of thumb screw 20 make the accurate adjustment referred to.

It is understood that plate 13 has a slight swinging movement under operation of thumb screw 20, and, to permit this movement, post 15 is pivotally mounted upon plate 13, and the base of bracket 18 is pivotally mounted upon arm 2, as above mentioned, since these pivotal mountings of the parts are required so that post 15 may move longitudinally of the stem of screw 20.

In order to reduce the weight of the device the middle portion of plate 13 may be removed and an aperture formed therein, as indicated at 22.

To the end that the movements of arm 1 of the calipers may be under convenient control with reference to arm 2, plate 23 is employed and mounted slidably thereon. This plate is provided at longitudinal intervals with elongated slots 24; suitable screws, lug-members or keepers 25 traverse these slots and are secured to arm 1. Preferably the lug-members are provided with flat heads adapted to cover the slots, and since the bodies of the lugs have diameters substantially the same as the width of the slots, plate 23 may have a movement longitudinally of arm 1, but a transverse movement thereof is prevented. The inner end of plate 23 is provided with a concaved edge 26, the same being toothed, serrated or milled to correspond with the periphery of flange 8 of pivot-member 5.

In operation, arm 1 may have swinging movements upon pivot-member 5 except when prevented by plate 23. Plate 23 may have longitudinal movements upon arm 1, subject to the limitations of lug-members 25, and when moved inwardly, its concaved, rugose edge 26 may engage the rugose periphery of flange 8, and a swinging movement of this caliper arm will be prevented. In practice, after the caliper arms have been disposed to ascertain the diameter of an object, plate 23 may be moved inwardly; by this operation arm 1 becomes rigidly secured upon pivot-member 5, and any movement of arms 1 and 2 with reference to each other will thereby be prevented.

In order that plate 23 may be under convenient control for readily causing a longitudinal adjustment thereof so that arm 1 may be secured in a fixed or rigid relation with reference to pivot-member 5 or may be released therefrom, certain devices are provided and are now to be described.

Screw-post 27 is secured upon arm 1, and the elongated aperture 28 is formed in plate 23 between slots 24, said aperture having a concavedly formed wall 29 formed outwardly inclined, said outward inclination being in the direction of the toothed or milled end of the plate. A lug 30 is secured upon the upper side of plate 23 adjacent to aperture 28 and opposite to wall 29 thereof, said lug having an inclined wall 31 disposed substantially parallel with wall 29 of aperture 28 and projecting outwardly to overhang aperture 28.

At 31' is indicated a wing-nut mounted upon screw-post 27, and having adjacent, outwardly and inwardly inclined, peripheral portions indicated, respectively at 32 and 33; and it will be understood that when the nut is rotated, and thereby is moved in a direction of arm 1, inclined wall portion 33 of the nut will have a bearing upon inclined wall 29 of the aperture, and will cause a longitudinal movement of the plate, end 26 thereof moving into contact with the periphery of annular flange 8, to cause the rigid or locked relation of these parts. Also it will be seen that, thereafter, a rotation of the nut in an opposite direction, will cause the inclined wall of lug 30 to have a bearing upon peripheral wall-portion 32 of the nut, this operation causing a sliding movement of plate 23 in a direction opposite to that just described, with the result that end 26 of this plate will be released from the milled periphery of annular flange 8.

The device provides a pivotal mounting of strong construction and comparatively light weight, these features being desirable where the structure is metallic, the controlling and adjusting devices being convenient in use and reliable in operation.

At 34 is indicated an inclosing-cap arranged to have a mounting upon the blank, reduced portion 39 of keeper 11, to overhang or inclose the toothed end 26 of plate 23. It is provided with an annular, central, disk-like projection 35 upon its inner side adapted to have a seating within recess 7 so that the cap may be maintained reliably with its periphery flush with the inner terminal of arm 1.

At 36 is indicated a disk-nut mounted upon the threaded, reduced terminal 37 of keeper 11, whereby the parts relating to the pivotal mounting of the caliper arms are reliably connected.

At 38 is indicated a washer which may be employed, the same being seated between plate 13 and arm 2.

Having fully explained the several parts and their uses, a further description relating to operation is not necessary.

What I claim as my invention and desire to secure by Letters Patent is,—

1. In combination, a cylindrical pivot-member provided with a serrated, peripheral, terminal flange, its opposite terminal being formed with angularly formed facets; a first caliper arm, a second caliper arm, said arms being mounted upon and normally rotatable upon said pivot-member; an engaging-plate seated upon the first caliper arm and provided with a serrated terminal disposed normally adjacent to the terminal flange of said pivot-member; an adjusting-plate mounted upon the second caliper arm and having an apertured terminal with walls angularly disposed with reference to each other, said walls being in engagement with the facets of the pivot-member; means upon the second caliper arm and its adjusting-plate for controlling the pivotal movements of said arm; means for causing longitudinal movements of said engaging-plate, its serrated terminal during one of its movements engaging the serrated flange of said pivot-member.

2. In combination, a pivot-member provided with a serrated peripheral flange; a first caliper arm, a second caliper arm, said arms mounted and normally rotatable upon the pivot-member; means for preventing a rotatable movement of the first caliper arm, said means comprising an engaging-plate seated upon said arm, said plate being provided with a concaved, serrated, terminal normally disposed adjacent to the flange of the pivot-member and formed with an aperture having a wall inclined outwardly in the direction of said serrated terminal, a screw-post mounted upon said first caliper arm traversing said aperture, a bearing-nut having an inclined annular wall portion adapted to engage the inclined wall of the aperture of said plate, the operation being that a rotatable movement of the bearing-nut causes the serrated terminal of the engaging-plate to make contact with the serrated peripheral flange of the pivot-member; and an adjusting-plate mounted non-rotatably upon said pivot-member, said adjusting-plate being connected with and having devices thereon for controlling the pivotal movements of said second caliper arm.

3. In devices for the purpose described, a cylindrical pivot-member having a longitudinal, threaded aperture and formed with a terminal recess and a transverse flange outwardly of said recess; a pair of caliper-arms pivotally mounted upon the pivot-member and normally rotatable thereon; a detent plate provided for and connected with each of said caliper-arms, the detent-plate of one of said arms having a mounting upon the pivot-member, the detent-plate of the other caliper arm adapted to make contact with the transverse flange of said pivot-member; a recessed inclosing-cap disposed to overhang the transverse terminal flange of the pivot-member, and having an annular projection upon its inner side adapted to have a seating within the terminal recess of said pivot-member; a screw member engaging the threaded aperture of the pivot-member and traversing the inclosing-cap; and a disk-nut mounted upon the screw member and disposed within the recess of inclosing-cap.

In testimony whereof I have affixed my signature in presence of two witnesses.

JOHN ZHERDEFF.

Witnesses:
HIRAM A. STURGES,
MIKE LEHONIN.